United States Patent [11] 3,628,971

[72] Inventor Arthur Karchmar
Clifton, N.J.
[21] Appl. No. 8,054
[22] Filed Feb. 2, 1970
[45] Patented Dec. 21, 1971
[73] Assignee International Telephone and Telegraph Corp.
New York, N.Y.
Continuation-in-part of application Ser. No. 690,755, Dec. 15, 1967. This application Feb. 2, 1970, Ser. No. 8,054

[54] CEDAR POLYPHENOLS AND THIODIPROPIONIC ACID AS ANTIOXIDANTS FOR USE IN ANIMAL FATS AND VEGETABLE OILS
5 Claims, No Drawings

[52] U.S. Cl. .................................................... 99/163, 99/150, 252/404, 260/398.5
[51] Int. Cl. .................................................... A61k 7/00, A61l 23/00
[50] Field of Search ............................................ 99/1, 2, 157, 163, 164, 118, 150; 252/404, 405, 407; 260/398.5, 578

[56] References Cited
UNITED STATES PATENTS

| | | | |
|---|---|---|---|
| 2,333,658 | 11/1943 | Mattill et al. .................. | 260/398.5 |
| 2,334,564 | 11/1943 | Lewis ........................... | 252/404 |
| 2,373,192 | 4/1945 | Lauer ........................... | 99/163 X |
| 2,721,804 | 10/1955 | Rosenwald ................... | 99/163 |
| 3,156,728 | 11/1964 | Orloff et al. .................. | 260/578 |
| 3,390,098 | 6/1968 | Van Ness...................... | 252/404 |
| 3,502,594 | 3/1970 | Ahrens.......................... | 252/404 X |
| 3,502,702 | 3/1970 | Howard......................... | 260/398.5 |

OTHER REFERENCES

Forest Products Research Branch (1963) Red Cedar etc. by J. A. Gardner pp. 10, 11

The Polyoxyphenols of W. Red Cedar Abstract by Gardner et al. Canadian J. Chem. Vol. 37 (1959) pp. 1703–1705

*Primary Examiner*—Norman Yudkoff
*Assistant Examiner*—F. E. Drummond
*Attorneys*—C. Cornell Remsen, Jr., Walter J. Baum, Percy P. Lantzy, J. Warren Whitesel, Delbert P. Warner and James B. Raden

ABSTRACT: Mixtures of cedar polyphenols and thiodipropionic acid exhibit synergistic antioxidant effects when added to animal fats and vegetable oils and foodstuffs containing these materials. The amount of the polyphenol component of the mixture should be at least equal to the amount of thiodipropionic acid therein. These cedar polyphenol-thiodipropionic acid additives greatly increase the storage life of fats and oils when added thereto in amounts of at least about 50 per million.

CEDAR POLYPHENOLS AND THIODIPROPIONIC ACID AS ANTIOXIDANTS FOR USE IN ANIMAL FATS AND VEGETABLE OILS

This application is a continuation-in-part application of my copending joint application, Ser. No. 690,755, filed Dec. 15, 1967, entitled, "Plastic Acid and Thiodipropionic Acid as Antioxidants for Use in Animal Fats and Vegetable Oils."

This invention relates to a method for substantially retarding the rate of autooxidation and the concomitant rancidity associated with animal fats and vegetable oils and foodstuffs containing these materials. In particular, it relates to the addition to said fats and oils of an effective amount of an antioxidant comprising a mixture of cedar polyphenols and thiodipropionic acid. This antioxidant combination is effective at both ambient temperature and at high temperature (190° C.) which makes it particularly suitable in certain food processing operations.

Animal fats and vegetable oils and foodstuffs containing these materials exhibit a natural tendency to become rancid upon standing at ambient temperatures for various periods of time because of autooxidation. The objectionable flavors and odors that are thereby produced make these natural products unsuited for human consumption. In addition, the oxidation process diminishes the nutritional value of these products through the destruction of vitamins and essential fatty acids.

Antioxidants, by acting as preferential oxygen acceptors, retard the process of autooxidation and, therefore, increase the storage life of food products. Since these antioxidants are to be added to edible products for human consumption, they must be relatively nontoxic at normal dose levels, and must not impart any flavor or odor of their own to the foodstuff.

Various compounds have been utilized as antioxidants in foodstuffs including butylated hydroxy toluene (BHT), butylated hydroxy anisole (BHA), methionine and 1-proline. These compounds have not been wholly satisfactory for a variety of reasons among which are their high cost, toxicity and lack of "carry-through" in which the inhibitory action of the antioxidant is carried over into the finished food product as, for example, into baked goods. Furthermore, the use of BHA and BHT is restricted to the United States and is prohibited in some European countries because of toxicity. Propyl gallate (PG), which is used in most commercial lards and safflower oils in conjunction with BHT and BHA, is a powerful antioxidant, but has the disadvantage of producing objectionable blue or green colors in foods in the presence of iron or copper and small amounts of moisture.

The use of thiodipropionic acid (TDPA) as an antioxidant is known, but it is considered as being relatively ineffective as an antioxidant in animal fats and vegetable oils. With cedar polyphenols, however, it is a highly effective antioxidant in animal fats and vegetable oils.

The present invention is based on the discovery that mixtures of cedar polyphenols and thiodipropionic acid (TDPA) exhibit exceptionally good antioxidant properties when used in conjunction with animal fats and vegetable oils and food stuffs containing these materials.

Generally, the present invention comprises a method for substantially retarding the rate of autooxidation in animal fats and vegetable oils which comprises adding to said fats and oils an effective amount of a mixture of cedar polyphenols and thiodipropionic acid (TDPA). The combination of cedar polyphenols and TDPA exhibits a synergistic antioxidant effect with the result that the combination of the two compounds, when used as an additive in fats and oils and natural food products containing these materials, produces a far greater antioxidant effect than would normally be expected from either one of these compounds alone. This is surprising in view of the fact that TDPA alone is relatively ineffective as an antioxidant in fats and oils.

I have found that polyphenols suitable for use in the present invention can be prepared advantageously from such sources as red cedar wood. Generally, red cedar wood (*Thuja plicata*) includes from 5 percent to about 15 percent of a mixture of nonvolatile, water-soluble compounds. A major component of this mixture, varying in amount from about 1 percent to 5 percent of the weight of the wood, is plicatic acid. However, the aqueous extract of this wood includes not only plicatic acid, but also a substantial amount of less acidic phenolic compounds which are collectively known as polyphenols. The principal component of these polyphenols has been found to comprise lactones of plicatic acid having the same catechol-like grouping in the molecule as plicatic acid. Also present in the extract are various carbohydrates and some salts.

The results of investigations relating to the extraction of chemicals such as plicatic acid and the polyphenols from western red cedar wood, the identification of these chemical constituents, the yields obtained and the methods used for the separation of the extract into its various components have been discussed in two articles entitled, "Polyphenols of Western Red Cedar, by Gardner, Barton and MacLean, Can. J. Chem., Vol. 37, 1703-9 (1959), and "The Chemistry and Utilization of Western Red Cedar," by Dr. J. A. F Gardner, Department of Forestry, Publication No. 1,023, 1963, Department of Forestry, Canada.

One method for the extraction of plicatic acid and the polyphenols from cedar wood and their purification comprises neutralizing an acidic aqueous extract of red cedar wood with a suitable base such as sodium hydroxide. The neutralized solution is then passed through an ion-exchange column filled with a suitable molecular adsorption-type phenol formaldehyde resin having its active exchange centers in the sodium state, a clean separation of the polyphenols and the plicatic acid is obtained. The polyphenols are adsorbed on the adsorption resin while the plicatic acid and carbohydrates pass through unchanged. At the conclusion of the adsorption cycle, after the plicatic acid effluent has been removed, the polyphenols are eluted from the adsorption resin with a suitable organic solvent such as acetone, methanol or methylethylketone, leaving the resin in proper condition for the next adsorption cycle of the neutralized extract. The polyphenols are recovered from the eluate in pure form by simply evaporating off the solvent. The plicatic acid is recovered from the effluent by some suitable method, such as adding sodium chloride, acidifying the mixture with hydrochloric acid and then extracting the plicatic acid therefrom with a solvent such as methylethylketone. On evaporation of the solvent a relatively pure plicatic acid is obtained.

The major portion of the cedar polyphenols is believed to be open-chain substituted 2,3-dibenzyl butyrolactones having the following structural formula:

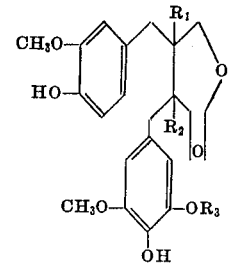

where $R_1$ is either H or OH, $R_2$ is either H or OH, and $R_3$ is either H or $CH_3$.

More particularly, I have found that mixtures of cedar polyphenols and thiodipropionic acid wherein the amount of polyphenols in the mixture is at least substantially equal to the amount of thiodipropionic acid therein, are synergistically more effective antioxidants for edible oils and fats then equivalent amounts of either component taken separately or in combination with other known antioxidants. In a preferred embodiment of my invention, the ratio of polyphenols to thiodipropionic acid to be employed in forming the antioxidant mixtures should be in a range of from about 1:1 to about 2:1.

It has been found that only very small amounts of the antioxidant mixture of cedar polyphenols and thiodipropionic acid need be employed to achieve outstanding antioxidant results. The actual amount to be used will vary over a rather broad range depending upon such factors as the particular product to which the mixture is added, the exact purpose for which it is added and the like. Normally, it is preferred to employ an amount of antioxidant mixture ranging from about 50 to about 400 parts per million. In a most preferred embodiment of my invention, the amount of antioxidant mixture to be used ranges from about 100 to about 250 parts per million. However, as mentioned, the amount of polyphenol-thiodipropionic acid product to be incorporated for a given application depends upon several factors and may vary widely.

The following example is set forth for the purpose of illustration only and is not intended to be construed as being limitative in any respect.

EXAMPLE

For purposes of study, the samples of fats and oils selected were free of antioxidants; commercial lard and oils of the same type containing antioxidants were used as subcontrols. BHT and BHA combined, cedar polyphenols and methionine combined, cedar polyphenols and 1-proline combined, methionine alone and 1-proline alone were introduced into antioxidant-free fat and oil samples for a straight comparison with polyphenol-thiodipropionic acid antioxidant mixtures.

A total of 40 samples of lard and oils was weighed into 150 ml. beakers. A total of 40 samples of the various antioxidants was weighed, all in the same concentration of 0.015 percent based on the weight of lard or oil. Whenever a combination of two antioxidants was used (BHT + BHA, cedar polyphenols + methionine, and cedar polyphenols + 1-proline) or an antioxidant and a synergist (cedar polyphenol +thiodipropionic acid) respectively, the total mixture was weighed to represent 150 parts per million.

The various antioxidants samples were weighed into microbeakers, dissolved in a small amount of absolute ethanol and transferred quantitatively into the oil and lard. The latter were then slightly heated to evaporate the ethanol and placed in an air-aerated oven at 58° C. (± 2). All samples in beakers were mixed with glass rods twice a day to permit an even exposure of oils and fats to the oven temperature.

Table I represents the effect of the various antioxidant additives in a sample of fresh lard as measured by its peroxide value (a measure of its oxidation) after a given period of time. It will be seen that the cedar polyphenols and thiodipropionic acid antioxidant additive was the most effective antioxidant tested.

TABLE I
[Sample: Lard (fresh, deodorized initial peroxide value=0.5 me. per 1,000 gr.)]

| Antioxidant additive | Concentration of antioxidants (p.p.m.) | Time (hrs.) | Peroxide test (me./ 1,000 gr.) |
|---|---|---|---|
| Control | 0 | 200 | 105.0 |
| Cedar polyphenols | 150 | 500 | 100.0 |
| Thiodipropionic acid | 150 | 300 | 102.5 |
| Methionine | 150 | 200 | 82.5 |
| 1-proline | 150 | 200 | 95.0 |
| Cedar polyphenols + Methionine | 100 + 50 | 500 | 92.5 |
| Cedar polyphenols + 1-proline | 100 + 50 | 500 | 92.5 |
| BHT + BHA | 75 + 75 | 500 | 82.5 |
| Cedar polyphenols + Thiodipropionic acid | 100 + 50 | 500 | 50.0 |

Table II represents the effect of various antioxidant additives in a sample of safflower oil after a given period of time as measured by its peroxide value. Here again, the mixture of cedar polyphenols and thiodipropionic acid was the best antioxidant of the group.

TABLE II
[Sample: Oil (Safflower, fresh)]

| Antioxidant additive | Concentration of antioxidants (p.p.m.) | Time (hrs.) | Peroxide test (me./ 1,000 gr.) |
|---|---|---|---|
| Control | 0 | 350 | 97.5 |
| Cedar polyphenols | 150 | 450 | 87.5 |
| Thiodipropionic acid | 150 | 350 | 85.0 |
| Methionine | 150 | 350 | 90.0 |
| 1-proline | 150 | 350 | 95.0 |
| Cedar polyphenols + Methionine | 100 + 50 | 450 | 85.0 |
| Cedar polyphenols + 1-proline | 100 + 50 | 450 | 85.0 |
| BHT + BHA | 75 + 75 | 450 | 82.5 |
| Cedar polyphenols + Thiodipropionic acid | 100 + 50 | 450 | 67.5 |

The above-tabulated results confirm that the antioxidant mixture of cedar polyphenols and thiodipropionic acid is a more potent antioxidant additive than any of the other antioxidants tested.

The combination of cedar polyphenols and thiodipropionic acid was shown to be a substantially better antioxidant additive than either cedar polyphenols or thiodipropionic acid taken alone. The antioxidant mixture of cedar polyphenols and thiodipropionic acid was shown further to be substantially more effective than mixtures of cedar polyphenols with other known antioxidants. These unexpected results are due to the synergistic effects between thiodipropionic acid and cedar polyphenols, it being previously noted that thiodipropionic acid alone and cedar polyphenols alone do not have an appreciable affect in retarding oxidation in these materials. It is contemplated that the percentage amounts of the various ingredients can be varied to suit any particular situation as the need arise.

While the invention has been described hereinabove in terms of a limited number of examples of the process and product thereof, the invention itself is not limited thereto, but rather comprehends all modifications of and departures from those examples falling within the spirit and scope of the appended claims.

I claim:

1. A method for substantially retarding the rate of autooxidation in a substance selected from the group consisting of animal fats, vegetable oils, foodstuffs containing these materials, and mixtures thereof, which comprises adding to said substance a synergistically effective amount of an antioxidant mixture of cedar polyphenols and thiodipropionic acid, said cedar polyphenols comprising open-chain substituted 2,3-bibenzyl butyrolactones having the following structural formula:

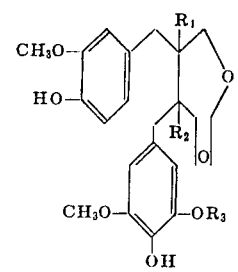

where $R_1$ is either H or OH, $R_2$ is either H or OH, and $R_3$ is either H or $CH_3$.

2. The method of claim 1 wherein the ratio of the amount of said polyphenols in said mixture to the amount of thiodipropionic acid therein is between about 1:1 to 2:1.

3. The method of claim 1 wherein the amount of said antioxidant mixture employed is from about 50 to about 400 parts per million.

4. The method of claim 2 wherein said mixture of polyphenols and thiodipropionic acid is added to said substance in an amount of from about 50 to about 400 parts per million.

5. The method of claim 1 wherein said polyphenols are prepared from red cedar wood.

* * * * *